United States Patent [19]

Lunde

[11] 4,376,127

[45] Mar. 8, 1983

[54] PROCESS FOR DEFLATULATING AND IMPROVING THE DIGESTIBILITY OF LEGUMES

[76] Inventor: Kenneth E. Lunde, 1101 Noel Dr., #4, Menlo Park, Calif. 94025

[21] Appl. No.: 227,599

[22] Filed: Jan. 23, 1981

[51] Int. Cl.³ .......................... A23L 1/20; C07G 17/00
[52] U.S. Cl. ........................................ 426/46; 426/52; 435/267
[58] Field of Search .................... 426/52, 44, 46, 53, 426/634; 435/267, 274

[56] References Cited

U.S. PATENT DOCUMENTS 3,293,143  12/1966  Heinicke ........................... 435/219
3,632,346  1/1972   Sherba ................................ 426/44
3,817,834  6/1974   Wilson ............................... 435/816
3,876,807  4/1975   Wagner et al. ..................... 426/634

OTHER PUBLICATIONS

Perlmann, G. E. and Lorand, Laszlo, "Proteolytic Enzymes", Methods in Enzymology, vol. XIX, ©1970, pp. 226–244 and 283 and 284.

Sugimoto, H. and Van Buren, J. P., *Journal of Food Science*, vol. 35, 1970, pp. 655–660.

Veebel, S., *The Enzymes*, Sumner and Myrbuck Eds., 1st Edn, vol. 1, New York, Academic Press, 1951, pp. 621–623.

*Primary Examiner*—Raymond N. Jones
*Assistant Examiner*—Elizabeth J. Curtin
*Attorney, Agent, or Firm*—Burns, Doane, Swecker & Mathis

[57] ABSTRACT

Legumes of the genus Phaseolus, genus Soja, and genus Lens and products thereof are deflatulated and their digestibility is improved by adding thereto an effective amount of an enzyme system found in components of the plants of pineapple and papaya.

16 Claims, No Drawings

PROCESS FOR DEFLATULATING AND IMPROVING THE DIGESTIBILITY OF LEGUMES

FIELD OF THE INVENTION

The present invention provides a means whereby the digestibility of legumes is improved and their flatulence-producing factors are rendered innocuous. More particularly, in one aspect, the present invention provides a process which comprises treating legumes with components of the pineapple and papaya plants, or products isolated from them, in an amount necessary to increase the legumes' digestibility and minimize or eliminate their flatus-causing factors. In a further aspect, this invention provides treated bean products which comprise beans prepared in their usual manners for human and animal consumption in admixture with papaya or pineapple plant components.

REFERENCE TO RELATED APPLICATION

This application is related to my U.S. patent application Ser. No. 06/227,602, filed of even date herewith. This other application employs neutralized enzyme systems to deflatuate legumes and to improve their taste and consistency when cooked.

BACKGROUND OF THE INVENTION

Legumes are an important foodstuff and are likely to become more so in the future. Those in some of the legume genuses, such as Phaseolus and Soja, are high in protein and provide an inexpensive alternative to animal protein, for the most part lacking only in methionine to provide a balanced diet.

Unfortunately, ingestion of some of the most nutritious and abundant legume genuses can be accompanied by severe flatulence and associated abdominal distress. The effect on individuals varies widely, but with some people it is sufficiently severe that they avoid consumption of these foods entirely.

Quantitative research on the gas-producing properties of legumes commenced in about 1948. Subsequent research has involved work with many of the species in the genuses having the greatest gas-forming tendencies. In general, this work has been aimed at identifying those components of the seed that are responsible for flatulence. One of the significant investigations in this direction was reported by Steggerda, et al., in *Soc. for Exper. Biol. and Med.*, 121, 1966, pp. 1235-9, who separated soybeans into various fractions and determined the flatus production in man with each of these fractions. They found that soybean hulls, fat, water-insoluble polysaccharides, and protein are not associated with flatulence production to any significant degree, and that the flatus-producing factor in soybeans was concentrated primarily in the low molecular weight carbohydrate fraction soluble in water. Research on other legume genuses pointed in the same direction. Compounds specifically identified as being a cause of flatus production are the alpha oligosaccharides, stachyose, raffinose, and verbascose.

The generally accepted explanation of the action of the alpha oligosaccharides in producing flatus is that the enzyme alpha galactosidase is not present in the intestinal tract of mammals. Thus, these compounds are not hydrolyzed and dissolved in the digestive tract so that they can be absorbed. Instead they reach the lower intestine essentially intact. Here anaerobic bacteria ferment these sugars with the resultant production of carbon dioxide and hydrogen, as well as some methane. Thus, these sugars are not only a source of discomfort but constitute a significant loss in nutritional value, since they amount to on the order of 4 percent of the total weight (dry basis) of white beans and 6 percent of soybeans.

Rackis in *ACS Symposium* Series 15, Sept. 11-12, 1974, pp. 207-221, reported an interesting experiment in which anaerobic cultures isolated from dog colon biopsies were used to treat a group of monosaccharides (glucose, maltose, fructose, galactose) and a group of oligosaccharides (sucrose, raffinose, and stachyose). It was found that the gas produced by all of these compounds (primarily carbon dioxide and hydrogen) was of essentially the same magnitude. Thus, any of these compounds reaching the lower intestine would result in gas formation. However, it is known that ingestion of either the monosaccharides or sucrose in normal quantities does not result in flatus. The significance of these results is that flatus production in the lower intestine may in part be related to solubility. The chemical structure of sucrose as a disaccharide is more similar to that of raffinose and stachyose than it is to the monosaccharides. Yet sucrose and the monosaccharides are highly soluble in water, whereas raffinose and stachyose have a much more limited solubility. High molecular weight polysaccharides, on the other hand, are so nearly insoluble that they may not be susceptible to anaerobic fermentation during the time of passage through the colon.

PRIOR ART

Having establishes that the alpha oligosaccharides present in legumes were responsible for flatulence and that the monosaccharide products of their hydrolysis did not cause flatulence, the solution to the problem would seemingly be simple. Various methods of hydrolyzing oligosaccharides have been known for many years. Perhaps the first patent on the subject was issued to Gollmert in 1906 (German Pat. No. 195,972). Gollmert used emulsin and similarly acting enzymes such as kefir lactose. Numerous other enzymes such as invertase, lactase, raffinase, and manninotriase have been reported in the technical literature as having the capability of hydrolyzing raffinose, stachyose, and verbascose.

The oligosaccharides can also be hydrolyzed by chemical means. In addition to inorganic acids such as hydrochloric, some organic acids also have this capability. Matumoto in *J. Chem. Soc. Japan*, 60, 1939, pp. 1127-48, found that sucrose, raffinose, and stachyose present in the Satsuma orange are easily hydrolyzed by citric acid at a pH of 1.7.

Certain enzyme systems have been used with considerable success to reduce the alpha oligosaccharide content of legumes. Sherba, et al., in U.S. Pat. No. 3,632,346, Ciba Geigy in French Pat. No. 2,137,548, and Sugimoto, et al., in *J. Food Sci.* 35, 5, 1970, pp. 665-60, have employed carbohydrate enzymes obtained from fungal yeast and bacterial organisms for hydrolysis. It has also been found that legumes themselves contain an alpha galactosidase, and in U.S. Pat. No. 3,876,807 of Wagner, et al., an autolysis process was employed wherein beans were held at 45° to 55° C. for 24 to 48 hours at a pH of 5 to 5.5. By this process the content of stachyose, raffinose, and phytic acid was greatly reduced.

Another approach to reducing the alpha oligosaccharide content of legumes has been extraction. Ethanol has been used. Also, by extensive blanching and soaking with water, and discarding the soak water prior to cooking, the alpha galactosides can be substantially removed, according to A. C. Olsen reporting at the *ACS Symposium on Anti-Nutrients and Natural Toxicants in Foods,* April 1979.

These simple and logical solutions have not proven effective, upon testing. Calloway, et al., report in *J. Food Sci.,* 36, 1971, pp. 251-5, on experiments in which various legumes were fed to humans and the quantity of flatus measured. It was found that some reduction in flatus occurred by enzyme treatment and by alcohol extraction, but that flatus was by no means completely eliminated. Products such as tempeh and tofu, from which nearly all carbohydrates have been removed, were found to be essentially non-flatulent.

The foregoing shows that heretofore no method of treatment has proved completely successful in eliminating flatulence and associated indigestibility from beans without removing nearly all of the carbohydrates present. Thus, there is a loss of a potentially nutritious component. Moreover, some of the methods that have been attempted require grinding the beans in the treatment process. Any method or formulation for solving the flatulation problem must not disturb other consumer-accepted bean properties. Such a method or formulation must not alter the texture of the final product. It must avoid emphasizing harsh bitter "off-flavors" inherently present in beans. Finally, to be commercially viable, it must neither significantly increase processing costs nor raw material expense of final bean products. The present process and formulation meets these objectives.

Additional prior art of interest includes the disclosure of several common cookbooks (for example, *Joy of Cooking,* Rombaner et al., 1971, p. 261) the addition of normally edible pineapple components—chunks, crushed and slices to baked bean dishes as garnishes or flavoring components. At no point do these teachings suggest the present deflatulation findings.

STATEMENT OF THE INVENTION

It has now been found that legumes of the genus Phaseolus, genus Soja and genus Lens are deflatulated and their digestibility is improved by admixing with said legumes effective amount of an enzyme system present in or isolated from inedible portions of the plants and/or fruit of pineapple or papaya. In one aspect, this invention relates to the process for deflatulating and improving the digestibility of these legumes. In a second aspect, this invention relates to the improved legume product which results.

DETAILED DESCRIPTION OF THE INVENTION

Definitions

In this patent application, these terms shall have the following meanings:

Juice—Pineapple juice normally consumed as an edible product.

Fruit—That portion of the tissue of a papaya or pineapple that is normally consumed as a solid edible product.

Peels and cores—The peels, cores, table trimmings, and other pineapple tissue processing residues that are normally considered inedible. These may have been mechanically pressed to recover additional juice. They may have been dried or may be undried. In dried form this material is commonly called Pineapple Bran.

Press juice—Fluids obtained by mechanically pressing peels and cores.

Syrup—Press juice that has been concentrated by evaporation or other means. It may or may not have been deionized prior to concentration.

Extract—Solutions that have been extracted by water from peels and cores whether the latter have been pressed or are unpressed. The extract may have been concentrated to a syrup and may or may not have been deionized prior to concentration.

Not normally consumed components—Peels and cores, press juice syrup not treated to the extent to be suitable for comingling with fruits or beverages, and extract of pineapple as well as latexes from papaya melon, leaves and trunks. "Normally consumed" is in reference to human consumption.

Enzyme system—The combination of enzymes present in a not normally consumed component.

Isolated system—Enzyme system such as Bromelain 1200 and Panol ® that has been recovered from a not normally consumed component.

Enzyme concentration—In the case of isolated systems, this is expressed as grams of total enzyme system per gram of total carbohydrate in the legume treated. In the case of plant components, this is expressed as total soluble solids in the plant component per gram of total carbohydrate in the dried legume treated. Among those specified, the total carbohydrate content varies from about 33% to 62% of the dried bean weight.

The Enzyme System Employed

The enzyme system employed in this invention may be selected from enzyme systems present in not normally consumed components of pineapple and papaya plants. These systems may be employed as isolated systems and may be so obtained such as the commercially available Bromelain 1200 of Dole Chemical Company (isolated from pineapple stem juice, and/or peels and cores) or Panol ® of Enzyco (isolated from latexes of papaya melon, leaves and trunks). These systems may also be employed as the not normally consumed components of pineapple and papaya.

The isolated systems, such as Bromelain 1200 and Panol ® are known as proteases and one of their principal uses is for tenderizing meats. The action of Bromelain 1200 is stated to be specific and to attack only specific bonds in protein materials.

Though the compounds bromelin and papain are thought to be the principal components of Bromelain 1200 and Panol ® respectively, both of these commercial preparations are actually enzyme systems. Bromelain 1200 is a mixture of proteases and also contains enzymes such as acid phosphatase, peroxidase, amylase, and pectinesterase. Heinicke in U.S. Pat. No. 3,293,143 mentions an even greater variety of non-proteases as having been isolated from pineapple stem juice, from which Bromelain 1200 is prepared. Panol ® has a similar mixed character.

A number of processes have been patented (or described in the technical literature) for the production of isolated bromelin- or papain-containing enzyme systems. They all involve precipitation of the enzyme system with an inorganic salt (usually ammonium sulfate) or with a lower aliphatic alcohol or ketone, or both (e.g., Wilson, U.S. Pat. No. 3,817,834, *Chemical Technology: An Encyclopedic Treatment* (Volume V), Barnes and Noble, New York, 1972). The product may vary in subsequent processing purity (e.g., ash content), yield, and so forth. However, they should all contain the same general group of enzymes and should all behave in much the same manner functionally. Thus, the scope of this discovery is not limited to the two aforementioned isolated enzyme systems but includes generally the enzyme systems isolated from and present in the not normally consumed components of pineapple and papaya plants.

The Legumes Treated

The legumes beneficially treated in accord with this invention include the legumes of the genus Phaseolus, genus Soja including the wheys derived therefrom, and genus Lens, both as the seeds (beans) themselves and as products made therefrom. These legumes include many prominent food materials, for example, the beans known as the "common beans" such as large white beans, California small white beans, pinto beans, red beans, black beans, calico beans, red Mexican beans, brown beans, bayo beans, and soy beans. These materials are usually cooked before consumption, as already noted. These legumes can not only be treated alone but also in combination with cooking liquids, gravies, sauces, or the like.

Treatment Conditions

The enzyme system can be added to the beans either before, during, or after cooking. No substantial difference in deflatulation effectiveness is noted when the enzyme is added to the initial bean soaking water without discarding the soaking water before cooking, to the bean cooking water after the soaking water is discarded, or the final bean product in its ready-to-eat form. The addition is effected by art-known mixing procedures such as by dispersing or dissolving the enzyme system or enzyme system-containing plant component in the bean soaking liquid, with the bean cooking liquid, or in the final bean-containing comestible product. If dried peels and cores are employed, they should be in a finely divided form, such as not coarser than about 15 mesh. Such a form is dispersible throughout the final bean product, and permits the enzyme system to contact the beans. Such a form also prevents the bean consumer from noticing unfamiliar substances in the final bean product.

The soaking time for uncooked beans is not critical to the practice of this invention, but of course, should be long enough so that the beans are fully rehydrated. The cooking time and temperature need only be sufficient to render the beans tender. In commercial canning, the temperature is normally about 250° F.

The minimum enzyme system concentrations I prefer are 0.005 for isolated systems such as Panol ® or Bromelain 1200. For plant components, the minimum concentration preferred is 0.065.

Maximum levels of enzyme system concentration are not critical. The systems can be incorporated in substantial excesses beyond the noted minimum levels, such as 5, 10 or even 20 times these levels. Excess concentrations may be advantageously used to ensure that even with errors of measurement and mixing an adequate amount of the system is present in all containers, to ensure the persons especially susceptible to the adverse effects of flatulence-causing compounds are protected. This suggests preferred maximum concentrations of five times the minimum concentrations given above.

ILLUSTRATIVE EXPERIMENTS

The invention is further illustrated by the following control experiments and examples. These are provided solely to exemplify the invention and are not to be construed as limiting its scope.

In these experiments reference will be made to an index of flatulence aptly named as "flatulence index", (f), and defined as follows:

$$f = t/W$$

where
- $t$ = duration of flatulence in minutes (severity of flatulence is related to its duration)
- $W$ = dry beans consumed, grams/kilogram of normal body weight
- $f$ = flatulence index As indicated by the equation, the flatulence index is a function of the quantity of beans consumed. It is also related to the kind of bean consumed and the treatment to which it has been subjected. Of course, when no flatulence is experienced, the index is zero.

Control Experiments

A. Commercially canned pork and beans in tomato sauce were warmed to serving temperature and then consumed in an amount of 2 grams per kilogram of body weight. After a period of about four hours, severe flatulence was experienced, which continued for another five hours. The flatulence was accompanied by considerable abdominal distress. Flatulence index—490.

B. Commercially canned "oven-baked" beans in a brown sauce were consumed under the conditions of Experiment A. Again, both flatulence and abdominal distress were experienced, but not as severely as in Experiment A. Flatulence index—245.

C. Rehydrated California white beans were cooked at 95°–100° C. with a tomato sauce at atmospheric pressure for a period of about 2.5 hours. The cooking pot was equipped with a reflux condenser to avoid evaporation loss. Upon consumption under the conditions of Experiment A, severe flatulence and abdominal distress were experienced. Flatulence index—520.

EXAMPLE 1

About 0.5 grams of Bromelain 1200 were added to 160 grams of pork and beans of the brand employed in Experiment A. The mixture was heated to 50°–70° C. for about five minutes and consumed. No flatulence or abdominal distress was experienced when this composition was consumed.

EXAMPLE 2

The experiment of Example 1 was repeated with one modification. The quantity of Bromelain 1200 was reduced to 0.14 grams. Again, no flatulence or abdominal distress was noted after consumption.

EXAMPLE 3

The experiment of Example 1 was repeated again with the modification that the Bromelain 1200 was further reduced to about 0.04 grams. Some flatulence but no abdominal distress was noted after consumption. Flatulence index—120.

EXAMPLE 4

In this experiment a bean composition was prepared by soaking dry beans, adding flavoring ingredients, and then pressure cooking at 15 psi for about one hour. Bromelain 1200 was added to the soaking water (which was not discarded prior to pressure cooking) in a concentration of about 0.0057 grams per gram of dry beans. No flatulence or abdominal distress was noted after consumption.

EXAMPLE 5

The experiment of Example 4 was repeated, replacing the Bromelain 1200 with the same concentration of an enzyme system prepared from papaya latex and marked by Enzyco under the trademark Panol ®. Only very slight flatulation was experienced. Flatulence index—5.

EXAMPLE 6

The experiment of Example 1 was repeated using a different source of enzyme system. The edible fruit was manually removed from fresh pineapple in a manner simulating the "eradicating" process used in the pineapple processing industry. The eradicated peels, which are rich in the enzyme system, were then dried and ground. 6.4 grams of the dried ground peels were then added to 160 grams of commercial canned pork and beans, heated, and consumed as in Example 1. No flatulence or abdominal distress was noted.

From the foregoing it is apparent that enzyme systems found in not normally consumed components of pineapple and papaya are completely effective in eliminating flatulence, abdominal distress, and digestive problems inherent in legumes of the genus Phaseolus, genus Soja, and genus Lens and their consumption.

What I claim is:

1. A process for increasing the disgestibility of an edible comprising a legume selected from the group consisting of legumes of genus Phaseolus, genus Soja, and genus Lens, and rendering innocuous flatulence causing factors therein which comprises admixing with said edible an effective disgestibility increasing and flatulence innocuous-rendering enzyme system found in the not normally consumed components of pineapple plants or papaya plants and selected from the group consisting of bromelin-containing and papain-containing enzyme systems.

2. The process of claim 1 wherein said admixing takes place prior to cooking said legume.

3. The process of claim 1 wherein said admixing takes place after cooking said legume and prior to consumption.

4. The process of claim 1 wherein said enzyme system is an isolated enzyme system.

5. The process of claim 4 wherein said isolated enzyme system is a bromelin-containing enzyme system.

6. The process of claim 4 wherein said effective amount is from 0.005 to 0.050 grams of enzyme system per gram of carbohydrate present in said legume.

7. The process of claim 6 wherein said legume is a common bean.

8. The process of claim 6 wherein said legume is soy bean.

9. The process of claim 1 wherein said effective amount is from 0.065 to 0.65 grams of plant component soluble solids per gram of carbohydrate in said legume.

10. An edible product characterized as being nonflatulent and as having improved digestibility and comprising beans selected from the group consisting of beans of the genuses Phaseolus, Soja, and Lens cooked in admixture with a digestibility improving, nonflatulent effective amount of an enzyme system found in the not normally consumed components of pineapple or papaya plants and selected from the group consisting of bromelin-containing and papain-containing enzyme systems.

11. The edible product of claim 10 wherein said enzyme system is a papain-containing enzyme system.

12. The edible product of claim 10 wherein said enzyme system is a bromelin-containing enzyme system.

13. The edible product of claim 12 wherein said enzyme system is present as an isolated system and said effective amount is from 0.005 to 0.050 grams of enzyme system per gram of carbohydrate in said beans.

14. The edible product of claim 12 wherein said enzyme system is present as a not normally consumed pineapple component and said effective amount is from 0.065 to 0.65 grams of soluble solids per gram of carbohydrate in said beans.

15. A process for increasing the digestibility of an edible comprising beans selected from the group consisting of beans of the genuses Phaseolus, Soja, and Lens which comprises adding to said edible, pineapple bran, extract or press juice syrup in an amount of from 0.065 to 0.65 grams soluble solids per gram of total carbohydrate present in said beans.

16. An edible common bean-containing product characterized as being nonflatulent and as having improved digestibility and comprising cooked beans selected from the group consisting of beans of the genuses Phaseolus and Lens in admixture with pineapple bran, extract or press juice syrup in an amount of from 0.065 to 0.65 grams of soluble solids per gram of total carbohydrate in said beans.

* * * * *